United States Patent [19]

Williams

[11] 3,830,349
[45] Aug. 20, 1974

[54] METHOD AND APPARATUS FOR ENGAGING COACTING PROPULSION SYSTEMS

[75] Inventor: Charles H. Williams, Export, Pa.
[73] Assignee: Koppers Company, Pittsburgh, Pa.
[22] Filed: May 1, 1973
[21] Appl. No.: 356,238

[52] U.S. Cl........... 192/103 F, 192/67 A, 192/84 P, 192/82 R, 74/661
[51] Int. Cl..................... F16d 23/10, F16h 37/06
[58] Field of Search......... 192/103 R, 103 F, 109 R, 192/84 D, 53 R, 67 A, 53 F; 74/661, 339

[56] References Cited
UNITED STATES PATENTS

| | | | |
|---|---|---|---|
| 2,640,573 | 6/1953 | Shenk | 192/53 F |
| 3,460,656 | 8/1969 | Swanson | 192/53 R X |
| 3,478,619 | 11/1969 | Shibata | 74/661 |
| 3,618,719 | 11/1971 | Marland et al. | 74/661 X |
| 3,669,234 | 6/1972 | Mathers | 192/4 C X |
| R27,219 | 11/1971 | La Vallee | 192/103 R X |

FOREIGN PATENTS OR APPLICATIONS 1,054,288   4/1959   Germany........................... 192/84 P Primary Examiner—Samuel Scott
Assistant Examiner—Lance W. Chandler
Attorney, Agent, or Firm—Olin E. Williams; Oscar B. Brumback; Boyce C. Dent

[57] ABSTRACT

A method of controlling the engagement of an accelerating or decelerating auxiliary propulsion system with a running primary propulsion system upon the occurence of synchronous speed and alignment of engaging elements in a connecting device by rotating the primary system at a substantially constant speed, accelerating or decelerating the speed of the auxiliary system toward that of the primary system, sensing the impending occurence of synchronous speed of the two systems and the occurence of alignment of the engaging elements and automatically engaging driving elements of the system in response to the occurence of synchronous speed and alignment. Apparatus suitable for performing the foregoing method comprises a primary and an auxiliary engine each connected to one half of a clutch or of a coupling which are engaged at the time synchronous speed and alignment of the clutch or coupling halves is achieved to thereby connect the engines for simultaneous operation. Sensing of impending synchronization is achieved by driving the first input of a planetary differential from the primary clutch or coupling half, driving the second input from the auxiliary clutch or coupling half in the opposite direction of rotation as the first input, and monitoring the speed of the planetary output; as this output approaches zero speed, a control means is energized for initiating engagement of the clutch or coupling halves so that actual engagement occurs at synchronous speed and exact mechanical alignment of the engaging elements. The control means is preferably arranged to control the acceleration or deceleration of the auxiliary engine prior to engagement of the engaging elements so that the engines approach synchronization very slowly.

26 Claims, 8 Drawing Figures

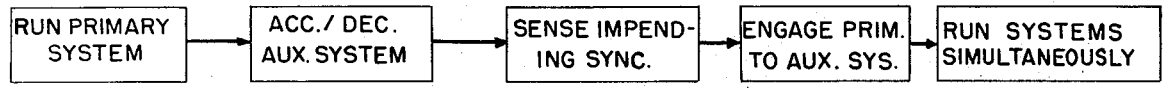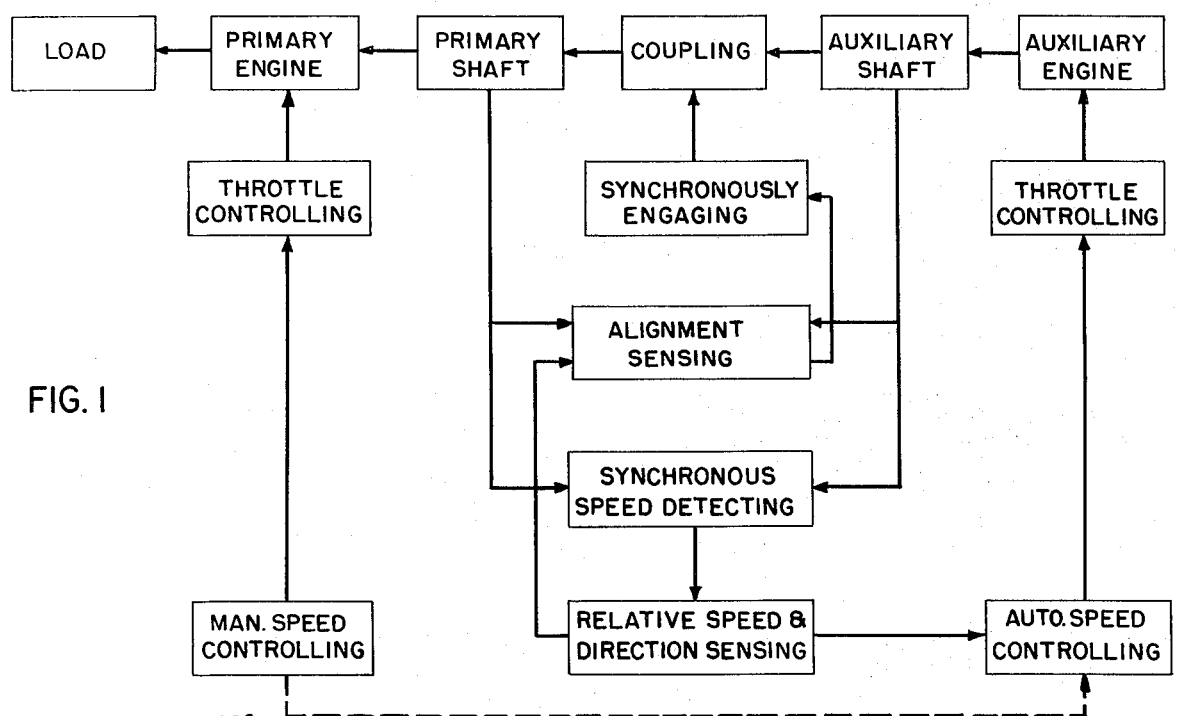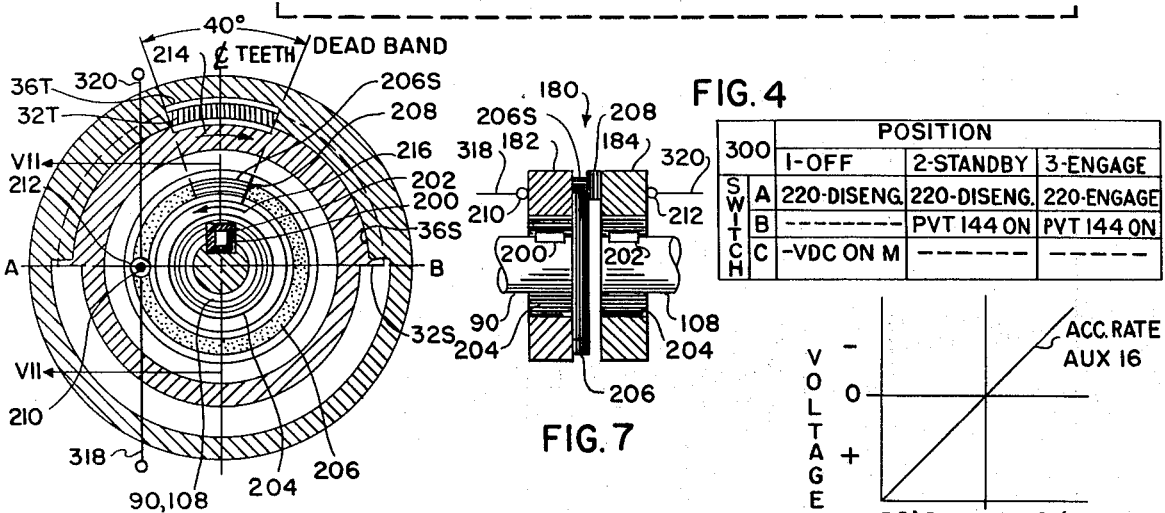

METHOD AND APPARATUS FOR ENGAGING COACTING PROPULSION SYSTEMS

BACKGROUND OF THE INVENTION

1. Field of the Invention

This invention relates generally to clutches and more particularly to clutch operators responsive to the rotational speed of the clutch elements.

2. Description of the Prior Art

High capacity propulsion systems, particularly marine propulsion drives, frequently use dual power systems such as gas turbine engines. Usually one turbine is the primary power source and the other is an auxiliary power source for providing additional power in time of emergency or other need. Ordinarily the primary system will be running or on-line and the auxiliary system will be at rest until needed; when needed, the auxiliary system is accelerated until it reaches synchronous speed with the primary system. At this time the systems are coupled to act in unison to furnish maximum power to the output of the primary system such as for driving a ships propeller or other load. It also frequently happens that the auxiliary turbine will be running on standby in anticipation of need. In this instance, being unloaded, the auxiliary turbine may be running faster than the primary turbine if its speed is not controlled. It should be understood, however, that such systems may be used in many applications, for example, in power generating stations.

Since the power to be transmitted is usually immense, the systems are usually coupled together with positive engagement devices such as dog clutches and gear type couplings. These devices customarily include interlocking surfaces such as lugs or gear teeth. Thus, it can be readily appreciated that engagement of the interlocking surfaces must occur very close to synchronous speed and alignment of the lugs or teeth to avoid damage to these surfaces.

One problem associated with this arrangement is the sensing of exactly synchronous speed and alignment of the surfaces to be interlocked and the concurrent engagement thereof. One known arrangement causes axial shifting of a coupling half into engagement with a mating half when the speed of the coupling half driven by the auxiliary turbine or engine overtakes the coupling half secured to the primary engine. An example of this arrangement is found in Clements U.S. Pat. No. 3,106,276 wherein a ratchet and pawl assembly overruns until the accelerating coupling half overtakes the running half. At this point, the pawl engages the ratchet teeth which then cause one of the coupling halves to shift axially by means of a helical spline. This arrangement is not particularly suited for the transmission of high torque at high speed because at least part of the torque is initially transmitted through the relatively weak ratchet and pawl assembly; in addition, it is not suited for engaging interlocking surfaces when the auxiliary system is decelerating toward synchronous speed with the primary system.

Another similar arrangement is shown in Sigg U.S. Pat. No. 3,154,181 wherein torque tending to be transmitted through a ratchet and pawl assembly following engagement of the coupling halves is relieved by a hydraulic system within the coupling. This arrangement is quite complex and expensive and is also not suited for engaging coupling members when the speed of the auxiliary system may be approaching synchronous speed from either direction.

Still another arrangement is shown in Shenk U.S. Pat. No. 2,640,573 which uses friction discs to force synchronization of the shafts to be coupled prior to coupling engagement of the torque transmitting elements. This arrangement requires some portion of the torque to be initially transmitted through the friction discs to achieve synchronization and therefore soon results in worn friction elements.

SUMMARY OF THE INVENTION

Accordingly, an object of the present invention is to provide a method and apparatus for controlling the engagement of coacting portions of primary and auxiliary propulsion systems by a simple means for achieving positive connection between the coacting portions of the systems when synchronous speed occurs regardless of whether the auxiliary system is accelerating or decelerating toward synchronous speed with the primary system. Since the portions to be coupled are relatively massive, the means for controlling synchronous engagement are preferably external to the coupling portions to permit use of a simpler coupling.

Another object is to provide a method and apparatus for engaging interlocking surfaces of a coupling connection between the propulsion systems when such surfaces are in angular alignment.

These and other objects are generally achieved by rotating the primary on-line system at substantially constant speed, accelerating or decelerating the auxiliary on-coming system toward the speed of the primary system, sensing the impending occurrence of synchronous speed of the two systems, sensing the alignment of interlocking surfaces to be engaged, and automatically engaging coacting interlocking surfaces between driving portions of the systems in response to the occurrence of synchronous speed and alignment.

This method may be achieved by the use of a clutch or coupling of which the halves thereof are secured respectively to substantially co-axially aligned and adjacent shafts extending from the primary and auxiliary propulsion systems; these halves are connected for driving rotation by engagement thereof when synchronous speed and alignment occurs to couple the shafts and thereby couple the propulsion systems for simultaneous operation. Coupling of the halves is advantageously accomplished by axially shifting one half toward the other to place interlocking surfaces such as gear teeth into positive driving engagement. Since axial shifting takes some small amount of time, a control means is used to sense impending synchronous speeds so that actual shifting can occur when the speeds of the coupling halves are synchronized and the teeth or lugs are in angular alignment.

Impending synchronization is preferably sensed by means of a planetary differential having a planetary output whose direction of rotation reflects acceleration or deceleration of the on-coming system and whose speed is directly proportional to the difference in speeds of the two inputs; one input being derived from the on-line engine and the other derived from the on-coming engine. As the input speeds approach synchronization, the speed of the planetary output decelerates to nearly zero; at this time a sensor is used to detect the speed and direction of rotation of the planetary output.

At a predetermined time approaching zero speed, the sensor energizes a shifting circuit which in turn energizes a shifting device to engage the coupling halves when interlocking surfaces on the halves are in alignment. The planetary output, of course, rotates in a direction depending on whether the on-coming system is accelerating or decelerating, it being understood that suitable gearing or the like is needed to cause one input to the differential to rotate in the opposite direction to the other because of the nature of such planetary differentials.

Since the planetary output speed decelerates as synchronization approaches, it can be used to proportionally control the acceleration or deceleration of the on-coming engine so that the speed of the on-coming engine will approach the speed of the on-going engine very slowly the closer it approaches synchronization. This is advantageous since there is less chance of the speed of the on-coming coupling half overtaking the on-going coupling half before engagement of the halves can be accomplished thereby providing ample time for actual engagement to occur.

When gear-type coupling halves are used as the coupling means between the engines, the ends of the gear teeth must be in substantial alignment at the time of engagement. If not, the force used to engage the halves is great enough to damage the coupling halves should the ends of the teeth be axially abutted. Thus, additional means are preferably used to sense the circumferential position of the gear teeth, referred to as angular alignment, and to bring the teeth into alignment prior to engagement.

This means preferably comprises one disc rotated by the primary system aligned with a disc rotated by the auxiliary system. The discs include segmental electrical contact surfaces in fixed angular alignment corresponding to the angular position of engaging surfaces of the coupling halves. Thus, by directing a control signal for engaging the coupling halves through the contact surfaces, engagement of the coupling halves occurs only when the coupling engaging surfaces are in alignment.

Since the auxiliary engine may often be running on standby in anticipation of need, the control system used to engage the systems preferably includes control means for causing the speed of the auxiliary system to automatically track the speed of the primary system. Thus, in a standby mode, the speed of the two systems will be nearly identical so that they may be coupled immediately when needed rather than having to wait for the auxiliary system to start from rest and then overtake the primary system.

This feature preferably comprises a mode selector circuit for connecting the primary motor control to the speed control of the auxiliary system when the auxiliary is running on standby but not coupled to the primary. Thus, as the speed of the primary system is manually changed, the speed of the auxiliary will follow automatically.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings where like parts are marked alike:

FIG. 1 is a block diagram illustrating the major functions of the invention;

FIG. 4 is a table illustrating the function of the mode selector circuit;

FIG. 5 is a graph illustrating the relationship between fluid pressure and voltage used to decrease the rate of acceleration or deceleration of the auxiliary system as its speed approaches synchronization with the primary system;

FIG. 6 is a diagrammatic illustration showing the angular relation of the alignment discs to the teeth of the coupling halves used to connect the primary and auxiliary systems;

FIG. 7 is a side elevation in cross-section of the discs of FIG. 6 taken along line VII—VII; and FIG. 8 is a block diagram generally illustrating the method steps of the present invention.

DESCRIPTION OF THE PREFERRED EMBODIMENT

Figure 2:
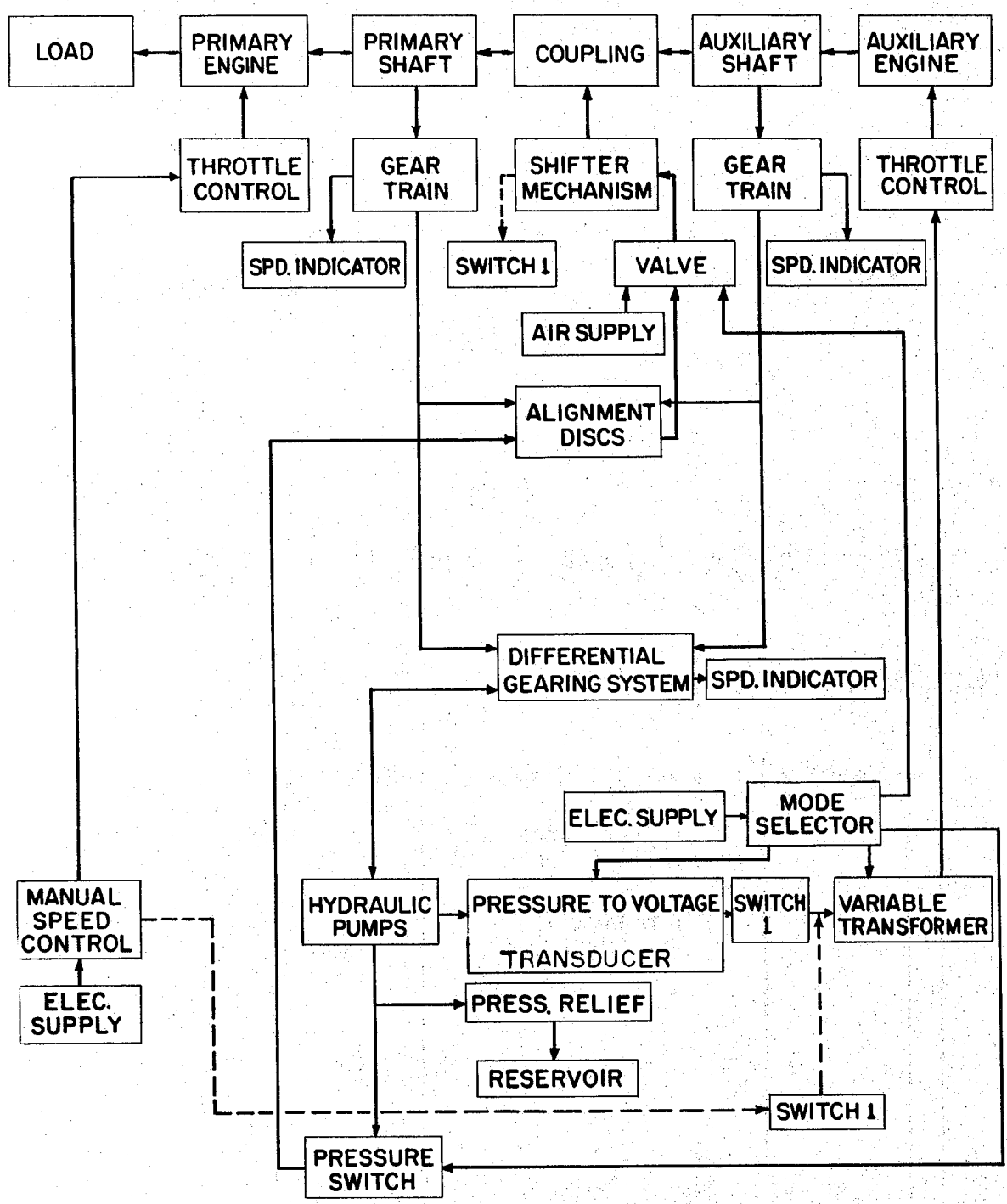
FIG. 2 is a more detailed block diagram generally illustrating the apparatus used for performing the functions of FIG. 1.

The preferred method of the present invention is generally performed in accordance with the block diagram of FIG. 1. A primary engine such as a gas turbine is connected to a load to be driven such as, for example, a ships propeller. Additional power, when needed, is supplied by a similar auxiliary engine. Since it is desirable to operate the engines simultaneously in series when additional power is needed, they are coupled by a clutch or coupling whose coacting halves are mounted on substantially coaxial connecting shafts extending from both engines. It should be understood, of course, that the alignment of the engines themselves need not be coaxial; suitable reduction gearing may be needed to transmit torque through the clutch or coupling. The engines are illustrated in coaxial alignment for simplicity; the shafts to be coupled must be in substantial coaxial alignment.

Since the type of coupling preferred for connecting the auxiliary engine to the primary engine includes interlocking lugs or teeth, these interlocking surfaces must rotate at synchronous speed and be in angular alignment before coupling can occur. When these two conditions are met, then the engaging mechanism is energized to engage the coupling halves.

Thus, a synchronous speed detector driven by both the primary shaft and auxiliary shaft is used to detect synchronism of these shafts. This detector includes an output connected to a relative speed and direction sensor. This sensor provides an output to an automatic speed control for the auxiliary engine which responds to the difference in speed above or below the speed of the primary engine to either speed up or slow down the auxiliary engine to approach synchronous speed with the primary engine. The automatic speed control also responds to the relative speed difference between the engines to cause the rate of acceleration or deceleration of the auxiliary engine to slow down as synchronous speed is approached.

An alignment sensor is driven from both the primary and auxiliary shafts and provides a current path when the interlocking surfaces of the coupling halves are in alignment. Thus, a signal produced by the relative speed and direction sensor is directed to the alignment sensor when the coupling halves reach synchronous speed. This signal waits momentarily if necessary until the current path is completed by the alignment sensor — indicating alignment of the interlocking surfaces — and then energizes the engaging mechanism to engage the coupling thereby connecting the power systems for simultaneous operation.

The automatic speed control provides an output to the auxiliary engine through a conventional throttle control which may mechanically regulate the speed of the auxiliary engine. Similarly, the manual speed control provides an output to the primary engine through another throttle control to regulate the speed of the primary engine.

After the power systems are coupled, it is desirable to regulate the speed of both power systems simultaneously to prevent one engine from lagging behind the other. Thus, after the systems are coupled, the relative speed and direction sensor is deactivated and the manual speed control is arranged to regulate the speed of the primary system and the auxiliary system through the automatic speed control.

The manual speed control is connected to the automatic speed control so that the auxiliary engine may be uncoupled from the primary engine but allowed to run on standby and to automatically follow the speed of the primary engine as previously explained or the auxiliary engine may be shut off completely.

The apparatus for performing the method of FIG. 1 is generally illustrated in block diagram form in FIG. 2. The alignment sensor includes coaxially aligned discs (to be subsequently explained in greater detail) which provide a current path for a signal to the engaging mechanism for the coupling. One disc of the sensor is driven through a gear train between it and the primary shaft and the other disc is driven through a similar gear train between it and the auxiliary shaft.

The synchronous speed detector preferably comprises a differential gearing system having one input driven from the same gear train that drives the sensor disc from the primary shaft and another input driven by the other gear train for the sensor disc from the auxiliary shaft. The output from the differential rotates at a speed corresponding to the difference in speed between the primary and auxiliary shafts and when the difference in speed is zero, the differential output will not rotate. In addition, is the primary shaft if running faster than the auxiliary, the differential output will rotate in one direction and if the auxiliary shaft is running faster than the primary, the differential output will rotate in the opposite direction. This indicates both the difference in speed between the primary and auxiliary shafts and which engine is running faster than the other.

The differential output is connected to a hydraulic pump which converts the speed difference of the shafts into hydraulic pressure corresponding in magnitude to the difference in speed between the primary and auxiliary shafts and provides two pressure paths one of which provides hydraulic pressure in response to the primary engine running faster than the auxiliary and the other of which provides hydraulic pressure in response to the auxiliary engine running faster than the primary.

The hydraulic pressure produced by the pump is first used to control the output of a variable transformer by converting the fluid pressure to electrical voltage with a pressure-to-voltage transducer. The output of the vehicle transformer is used to increase or decrease the speed of the auxiliary engine through the throttle control. In this manner, the auxiliary engine is caused to speed up or slow down until it is in synchronism with the speed of the primary engine.

Another output from the pump closes a pressure switch when the hydraulic pressure is reduced to a level corresponding to a one rpm difference in speed between the primary and auxiliary connecting shafts. This permits a signal to pass to the alignment sensor. If the discs of the alignment sensor are not in a position corresponding to alignment of the interlocking surfaces of the coupling, then the signal waits momentarily. However, the discs continue to rotate because of the one rpm difference in speed until the interlocking surfaces are in alignment which completes the current path through the sensor. The waiting signal then passes to a shifter mechanism which engages the coupling halves.

When the coupling halves are engaged, the position of the shifted half of the coupling opens a switch between the pressure-to-voltage transducer and the variable transformer to cancel the effect of the transducer on the transformer and simultaneously closes a switch between a manual speed controller and the variable transformer so that the manual controller can then be used to regulate the speed of the primary engine and simultaneously regulate the speed of the auxiliary engine through the variable transformer.

As shown in FIG. 2, excess hydraulic pressure not used to operate the pressure-to-voltage transducer and the pressure switch passes through a pressure relief valve into a hydraulic fluid reservoir from which the hydraulic pump also receives its supply of hydraulic fluid.

The shifter mechanism is preferably operated by pneumatic pressure which is supplied through a valve. The position of the valve is operated by a mode selector switch to prevent engagement of the coupling halves in the off or standby mode of the auxiliary engine and is operated by the signal through the alignment discs to cause engagement of the coupling halves when the mode selector is moved to an engage mode.

The gear trains may include speed indicators which can be read to determine whether or not the engines are running at the same speed and at what speed they are running. A speed indicator from the output of the differential indicates whether or not there is a difference in speed between the primary and auxiliary shafts.

Figure 3:
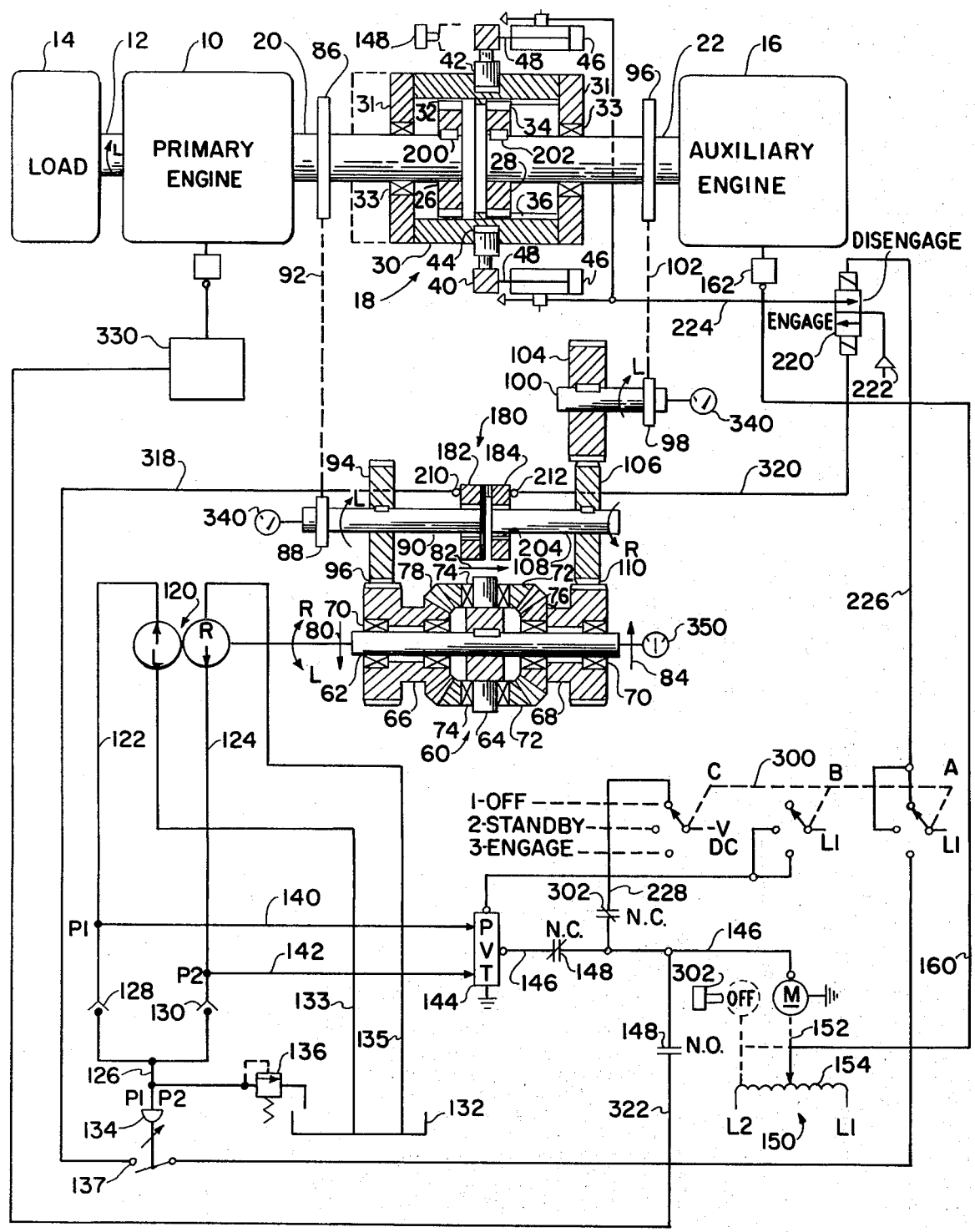
FIG. 3 is a diagrammatic illustration of the particular apparatus preferred for practicing the invention.

The specific apparatus preferred for performing the methods of this invention is shown schematically in FIG. 3. An on-line engine 10 includes an output shaft 12 for driving a load 14. Engine 10 is connected to an on-coming engine 16 by means of a coupling generally designated by numeral 18. A connecting shaft 20 connects engine 10 with coupling 18 and another shaft 22 connects engine 16 with coupling 18.

For purposes of illustration, coupling 18 may be a conventional gear-type coupling including a shifter mechanism for shifting one half of the coupling towards the other to effect engagement of the halves. It should be understood, however, that several types of couplings may be satisfactorily used, the only requirement being that driving portions of the coupling be capable of being engaged or disengaged.

More specifically, coupling 18 includes a hub 26 secured for rotation on the end of shaft 20 in the conventional manner and a similar hub 28 likewise mounted to the end of shaft 22. A sleeve 30 surrounds both hubs 26 and 28. The hubs 26 and 28 both include external spur gear teeth 32 and 34 respectively adapted for driving engagement with similar internal spur gear teeth formed on the inside of the sleeve 30. Preferably, the internal teeth are formed as a ring of teeth 36 extending a part of the length of sleeve 30 as shown. The sleeve 30 can be moved axially to bring internal teeth 36 into or out of engagement with external teeth 32 on hub 26 while the internal teeth 36 remain in engagement with external teeth 34 on hub 28 when the sleeve is engaged or not engaged with hub 26. Thus, hub 28 and sleeve 30 rotate any time that engine 16 is running.

Sleeve 30 includes end rings 31 secured thereto in the usual fashion, such rings being mounted to shafts 20 and 22 by bearings 33 which support the sleeve 30 for rotation about the shafts. Bearings 33 are retained in rings 31 and slide along shafts 20 and 22 to permit axial movement of sleeve 30 to engage hub 26.

Axial shifting of sleeve 30 is accomplished by axially moving a shifter ring 40 surrounding sleeve 30. Ring 40 includes a plurality of cam-follower type bearings 42 secured at intervals around the inner periphery of ring 40 (only two are shown) and extending into a groove 44 in sleeve 30. Cam-follower bearings 42 permit sleeve 30 to rotate at high speed even though shifter ring 40 remains stationary and provides axial movement of sleeve 30 by moving ring 40. Ring 40 is moved axially by one or more (two shown) conventional double-acting pneumatic cylinders schematically illustrated at 46. The actuator rods 48 of cylinders 46 are connected to shifter ring 40 so that when the rods 48 are extended by pneumatic pressure, they move ring 40 to the left as viewed in FIG. 3 thereby shifting sleeve 30 to the left to engage it with hub 26. Conversely, when rods 48 are retracted, sleeve 30 is disengaged from hub 26.

Other types of shifter apparatus may be used for engaging the coupling halves with equal success, it being understood that when an electric clutch is used, for example, the shifter mechanism may comprise only an electric circuit for energizing the coupling to bring frictionally engageable components into driving engagement. In the foregoing illustration, a signal is supplied to a control valve for actuating the cylinders 46 as will be subsequently described.

A planetary differential generally identified by numeral 60 comprises the previously mentioned synchronous speed detector. Although any one of several types of such differentials may be used, a bevel-gear type arranged for receiving a first input to one sun gear, a second input to another sun gear, and an output from the planet gears will be described for purposes of illustration. It should be understood that the differential is used for speed detection and control purposes; therefore, it need not be nearly as large as shown, that is, it can actually be far smaller than the coupling 18 shown in FIG. 3.

More specifically, the differential includes a central output shaft 62, the conventional supports for which are omitted for clarity. A planet gear support 64 surrounds and is keyed for rotation with shaft 62. Compound bevel and straight spur tooth sun gears 66 and 68 are mounted on pairs of bearings 70 on both sides of support shaft 64 so as to be freely rotatable around the output shaft 62. Bevel spur tooth planet gears 72 are mounted on bearings 74 retained on support shaft 64 in the usual manner so that planet gears 74 are freely rotatable around the support shaft 64. Bevel teeth 76 formed on planets 72 mesh in driving engagement with similar teeth 78 formed on sun gears 66.

In the type of differential just described, if the output shaft 62 is held stationary and sun gear 66 is rotated in the direction shown by arrow 80, then planet gears 76 will rotate in the direction of arrows 82 and the planets 72 drive sun gear 68 in the direction of arrow 84, that is, gear 68 will rotate in a direction opposite that of gear 66 but at the same speed. In this condition, with output shaft 62 held stationary, support shaft 64 will, of course, remain stationary. On the other hand, if one of the sun gears is rotated faster than the other, but in the opposite direction, output shaft 62 cannot be held stationary, it being rotated by support shaft 64 keyed thereto and carrying planets 72. The support shaft 64, hence, the output shaft 62, will rotate in the direction of the faster moving sun gear and its speed of rotation will be one half the difference in speed of the sun gears. But, at the moment the sun gears reach synchronous speed, the output shaft 62 will cease rotating.

Thus, it can now be seen that by rotating the first input sun gear 66 at the same speed as the primary shaft 20 and by rotating the second input sun gear 68 at the same speed as the auxiliary shaft 22, but in the opposite direction, when connecting shafts 20 and 22 are rotating at different speeds in the same direction, the output shaft 62 of differential 60 will be rotating in the direction of the faster rotating sun gear which rotation will correspond to the faster moving shaft 20 or 22. When shafts 20 and 22 reach synchronous speed, output shaft 62 will cease to rotate. Therefore, it can be seen that the condition of output shaft 62 will provide an exact indication of the difference in speed between shaft 20 and shaft 22, an indication of which shaft is running faster than the other by virtue of the direction of rotation of output shaft 62, and an indication of when shafts 20 and 22 reach synchronous speed by virtue of non-rotation of shaft 62. Thus, differential 60 provides a synchronous speed detector.

The first input to differential 60 is provided by a gear train including a conventional chain sprocket 86 secured for rotation with primary shaft 20, a chain sprocket 88 secured for rotation with an intermediate shaft 90, a roller chain 92 surrounding sprockets 86 and 88, and a gear 94 secured for rotation with intermediate shaft 90 having conventional straight spur teeth 96 in meshing engagement with similar teeth on sun gear 66. Thus, rotation of primary shaft 20 causes rotation of input gear 66 of differential 60 in a direction opposite to that of shaft 20.

The second input to differential 60 is provided by another gear train including a sprocket 96 secured for rotation with auxiliary shaft 22, a sprocket 98 secured for rotation with an idler shaft 100, a chain 102 surrounding sprockets 96 and 98, a gear 104 secured for rotation with idler shaft 100 in meshing engagement with a similar gear 106 secured for rotation with a second intermediate shaft 108 which shaft is coaxially aligned with the first intermediate shaft 90, and gear 106 having teeth 110 in meshing engagement with similar teeth on the second sun gear 68. Thus, rotation of auxiliary shaft 22 in the same direction as primary shaft 20 results in rotation of sun gear 68 in a direction opposite to that of the first sun gear 66 which is needed as previously explained.

The idler shaft 100, intermediate shafts 90 and 108, and differential output shaft 62 may all be bearing mounted in one housing which has been omitted for clarity, the construction and operation thereof being well understood by the artisan.

Differential output shaft 62 is connected to the input shaft of a tandem positive displacement hydraulic pump schematically illustrated at 120. Pump 120 may be for example a vane-type pump such as a VDR 11A series tendem variable volume vane pump produced by Miller Fluid Power Division of Flick-Reedy Corp., Bensenville, Illinois. Pump 120 includes two output lines 122 and 124 connected to common output line 126. Lines 122 and 124 each includes a conventional check valve 128 and 130 respectively. Thus, upon rotation of pump 120 in a left-hand direction by the differential output shaft 62, the left-hand vane of pump 120 indicated by letter "L" in FIG. 3 will draw hydraulic fluid from a reservoir 132 through line 133 and produce fluid pressure P1 in line 122 corresponding in proportion to the speed of the differential output shaft 62 rotating in the left-hand direction. This pressure P1 will pass through check valve 128 in line 122 but will not pass through check valve 130 in line 124 back to the right-hand output of pump 120 thereby producing fluid pressure P1 in common output line 126 to a pressure switch 134.

Conversely, rotation of differential output shaft 62 to the right causes the right-hand vane of pump 20 to draw fluid from reservoir 132 through line 135 and produce fluid pressure P2 in line 124 corresponding in proportion to the speed of the differential output shaft 62 rotating in the right-hand direction. This pressure P2 will pass through check valve 130 in line 124 but not through check valve 128 in line 122 back to the left-hand output of pump 120. Thus, pressure P1 or P2 exists in common output line 126 to the pressure switch 134 when differential output shaft 62 is rotating in either the right-hand or left-hand direction. Pressure P1 or P2 in line 126 in excess of that needed to hold pressure switch 134 open passes through a conventional relief valve 136 to reservoir 132 when pump 120 in rotating in either direction. Accordingly, pressure switch 134 is held open so long as there is a difference in speed between primary shaft 20 and auxiliary shaft 22 regardless of which shaft is running faster than the other. When synchronous speed of these shafts is reached within one rpm, differential output shaft 62 will be rotating in either the right-hand or left-hand direction but the fluid pressure produced by the pump 120 will be reduced to a level that it cannot keep pressure switch 134 open; therefore its contacts 137 will close thereby permitting an electric signal to pass through pressure switch 134. In this manner, a relative speed and direction sensor is provided which may be used to control engagement of the coupling 18.

Pressure switch 134 may be any of several types. For illustration, it may be a Model Number D1S-H2 diaphragm type with direct-acting snap switch produced by Barksdale Division of DeLaval Turbine, Los Angeles, California. Switch 134 is fluid pressure activated (from line 126), normally closed, and adjustable to provide electric contact closing at the fluid pressure selected. Thus, switch 134 may be adjusted to close its electrical contacts 137 at a fluid pressure corresponding to a one rpm difference in speed between primary shaft 20 and auxiliary shaft 22 as will be later explained in greater detail.

A fluid pressure transmission line 140 is connected to line 122 between check valve 128 and the left-hand output of pump 120 and another transmission line 142 is connected to line 124 between check valve 130 and the right-hand output of pump 120. Lines 140 and 142 lead to a pressure-to-voltage transducer 144 (hereinafter called PVT 144). The function of PVT 144 is to translate fluid pressure P1 in line 140 to plus polarity voltage in an electric output line 146 leading from PVT 144 and to translate fluid pressure P2 in line 142 to negative polarity voltage in the same output line 146. PVT 144 may be any of several types; for example a Model Number 1912 differential pressure transmitter produced by Leeds and Northrup, North Wales, Pennsylvania may be used. This transducer will produce plus and minus voltages in line 146 that are linearly proportional to fluid pressure P1 in line 140 or pressure P2 in line 142.

The voltage in line 146 passes through normally closed contacts of a limit switch 148 to a DC wiper motor M in a variable transformer 150. Motor M rotates in one direction to move a wiper 152 to the right, as viewed in FIG. 3, in response to plus voltage in line 146 and rotates in the opposite direction to move wiper 152 to the left in response to negative voltage in line 146. In this manner, wiper 152 is caused to pick off voltage from coil 154 in transformer 150 corresponding to the difference in speed between the primary shaft 20 and the auxiliary shaft 22. For example, assuming that both engines are running in a right-hand direction with primary engine 10 running faster than auxiliary engine 16, the differential output 62 shaft will rotate in direction "R" corresponding to the faster running engine as previously explained and will drive the right-hand vane of pump 120 (hereinafter called R.H. pump 120) thereby producing pressure P2 in line 124 and consequently in line 142 to PVT 144. PVT 144 will translate this pressure to positive voltage in line 146 to wiper motor M in variable transformer 150 to move wiper 152 to the right which results in higher voltage being picked off coil 154. Voltage from coil 154 is carried by line 160 to a conventional electrical-to-mechanical throttle control 162 which controls the speed of auxiliary engine 16. The throttle control is arranged to increase the speed of auxiliary engine 16 in proportion to an increase in voltage from variable transformer 150. Thus, as the wiper 152 moves to the right, the speed of auxiliary engine 16 will increase. But, as its speed increases, the speed of differential output 62 will correspondingly decrease because of a decreasing difference in speed between the auxiliary shaft 22 and the primary shaft 20 as previously explained. This reduces the pressure P2 produced by the R.H. pump 120. The reduced pressure results in a decreasing voltage output in line 146 from PVT 144 which causes wiper motor M to rotate slower thereby moving wiper 152 more slowly to the right. Thus, it can be seen that as auxiliary engine 16 approaches synchronous speed with primary engine 10, the slower will be the rate of acceleration of auxiliary engine 16. This is graphically illustrated in FIG. 5 which shows that as pressure P2 from the R.H. pump 120 to PVT 144 approaches equality with pressure P1 from the L.H. pump 120 (pressure P1 is "zero" with primary engine 10 running faster than auxiliary engine 16), the plus voltage decreases toward zero so that the rate of acceleration of the auxiliary engine 16 decreases linearly.

When the differential output shaft 62 stops rotating thereby indicating synchronism, then no pressure is produced by R.H. pump 120; thus P1 equals P2 and PVT 144 produces no output voltage and movement of wiper 152 stops. However, if auxiliary engine 16 is running in a standby mode and not engaged to the primary engine 10 by coupling 18, auxiliary engine 16, being unloaded, may tend to run faster than primary engine 10. Should it do so, differential output shaft 62 will rotate in an opposite direction than before, denoted left-hand. Thus, pump 120 rotates to the left causing pressure P1 in lines 122 and then 140 to PVT 144 resulting in negative voltage in line 146 which causes wiper 152 to move to the left thereby slowing auxiliary engine 16 until P1 again equals P2 at which time the speed of the primary engine 10 and auxiliary engine 16 are matched, that is, in synchronism. In this manner, the speed of auxiliary engine 16 tracks the speed of primary engine 10 and they will be at nearly synchronous speed whenever it becomes necessary to engage engine 16 to engine 10 by coupling 18.

From the foregoing, it can be seen that auxiliary engine 16 can be brought very slowly into synchronous speed with primary engine 10 and, when desired, to remain in synchronous speed with primary engine 10 even though the speed of primary engine 10 may fluctuate or be intentionally decreased or increased. When the speeds of the engines are in synchronism, the coupling 18 is ready for interlocking engagement except that its interlocking surfaces may not be in angular alignment which is necessary prior to actual engagement.

The previously mentioned alignment sensor, denoted 180 in FIG. 3, is used to detect angular alignment of the interlocking surfaces which are, for purposes of illustration, the internal gear teeth 36 on sleeve 30 to be meshed with external teeth 32 on hub 26 by axial movement of sleeve 30 to the left as viewed in FIG. 3. Obviously, if the teeth 36 happen to be directly opposite teeth 32 upon axial movement of sleeve 30, engagement cannot occur. Thus, axial movement of sleeve 30 must be made to occur at the instant that teeth 36 on sleeve 30 are opposite to the spaces between the teeth 32 on hub 26.

For purposes of illustration, hub 26 can be regarded as having 60 teeth and 60 corresponding tooth spaces between the teeth, and sleeve 30 as similarly having 60 teeth and 60 corresponding tooth spaces. During engagement, teeth 36 of sleeve 30 will be in the spaces between teeth 32 of hub 26 thereby providing driving engagement between the corresponding teeth.

In this illustration, a speed increase of 60:1 is provided by sprockets 86 and 88 and by sprockets 96 and 98 to intermediate shafts 90 and 108 respectively to make shafts 90 and 108 rotate sixty times for each revolution of primary shaft 20 and auxiliary shaft 22. This ratio is not illustrated to scale in FIG. 3, it being understood that it may be more convenient to provide such speed increase by compound gears and the like as will be well understood by the artisan. Thus, it can be seen that each disc 182 and 184 will make one complete revolution for each 1/60 revolution of hub 26 and sleeve 30, that is, one complete revolution for each tooth and adjacent tooth space on hub 26 and on sleeve 30 respectively.

This relationship is illustrated schematically in FIG. 6 where the segment 36S extending between points A and B above the horizontal centerline represents the width of a tooth 36 on sleeve 30. Segment 32S extending between the points A and B above the horizontal centerline represents the width of tooth 32 on hub 26. The spaces between the ends of segments 36S and 32S extending between points A and B below the horizontal centerline represents the spaces between teeth 36 and the spaces between teeth 32. In the position shown, the segments represent the teeth 32 and 36 axially abutting and engagement cannot occur. However, if segment 36S is held stationary and segment 32S is rotated 180° to below the horizontal centerline, the teeth 32 will be opposite the tooth spaces between teeth 36 of sleeve 30 and axial engagement can occur. Thus, it can be seen that any attempt to axially shift sleeve 30 must occur in this latter position.

However, it would be extremely difficult to determine the precise instant that teeth 32 of hub 26 are exactly opposite the spaces between teeth 36 on sleeve 30 because of practically zero clearance between the meshing teeth and to shift sleeve 30 at that precise time. Therefore, the teeth 32 on hub 26 and the teeth 36 on sleeve 30 are pointed on the ends that are axially adjacent to each other so that sleeve 30 may be shifted into engagement with hub 26 any time that these pointed ends are not themselves directly opposed. Direct opposition of these teeth is represented by the dead band on FIG. 6; the points of sleeve teeth 36 being denoted schematically by the dotted portion 36T and the points of teeth 32 being denoted by the vertically hatched portion 32T. A dead width of 40° during which engagement should not be attempted is sufficient to assure that the pointed ends of the teeth will not be opposite one another when sleeve 30 is shifted. Thus, if axial shifting of sleeve 30 occurs during the remaining 320°, the pointed ends of the teeth will slide on the sides of the pointed portion of the teeth of the adjacent member so that hub 26 and sleeve 30 will gradually slide into engagement. An example of tooth pointing that may be satisfactorily used is illustrated in Sigg U.S. Pat. No. 3,348,645.

Therefore it is necessary to arrange the geometry of coupling 18 and sensor 180 so that alignment of the sensor discs 182 and 184 corresponds to the alignment of teeth 32 on hub 26 with teeth 36 on sleeve 30. This is accomplished by mounting hub 26 on primary shaft 20 by a key 200 (FIG. 3) that is in angular alignment with one of the teeth 32 on hub 26 and by mounting hub 28 on auxiliary shaft 22 by a key 202 that is in alignment with a space between the teeth 34 on hub 28. Since teeth 36 on sleeve 30 rest in the spaces between teeth 34 on hub 28 at all times, this arrangement results in teeth 36 on sleeve 30 being in a position to axially abutt teeth 32 on hub 26 when keys 200 and 202 are in angular alignment. Thus, in this exact position and for 20° on each side to provide the 40° dead band for safety, hub 26 and sleeve 30 cannot be engaged. But, because the teeth are pointed as previously explained, engagement can occur during the remaining 320° of rotation of discs 182 and 184.

Since discs 182 and 184 are keyed to their support shafts 90 and 108 respectively and these shafts are connected to primary shaft 20 and auxiliary shaft 22 by sprockets and chains as previously explained, then it is evident that the angular alignment or discs 182 and 184 remains fixed with respect to teeth 32 on hub 26 and with teeth 36 on sleeve 30.

To provide an indication of when engagement can occur, that is, when teeth 36 are substantially opposite the spaces between teeth 32, the discs 182 and 184 are both insulated from their respective support shafts 90 and 108 by an insulating bushing 204 but the discs are themselves conducting. Disc 182 includes a wiper ring 206 of which a segment 206S is of a non-conducting material while the remainder of the ring will conduct. Disc 184 includes a narrow conducting wiper 208 that rotates with disc 184 in rubbing contact with wiper ring 206 on disc 182. Thus, as wiper 208 passes nonconducting segment 206S, no signal will pass through discs 182 and 184 but when the wiper 208 passes onto the remainder of the conducting ring 206, then a signal will pass through disc 182, ring 206, wiper 208, and disc 184. A signal from pressure switch 134 is applied to disc 182 by a rubbing contact 210 and is taken from disc 184 by a rubbing contact 212, the function of which will be later explained.

Therefore, it can be seen from FIG. 6 that the points of teeth 32 and 36 represented by 32T and 36T comprising the 40° dead band are in angular alignment with nonconducting segment 206S of ring 206 and that the dead band is in alignment with keys 200 and 202 as set forth above and wiper 208 is just beginning to pass insulating segment 206S. Thus, in the position shown, discs 182 and 184 will not pass a signal from contact 210 to contact 212. But when wiper 208 passes onto the conducting portion of ring 206, a signal will pass through the discs. At this point, the dead band representing the axially abutted teeth will be passed and engagement of the teeth of hub 28 and sleeve 30 can be made to occur.

It should be noted that shafts 90 and 108 are rotating in opposite directions even though the primary shaft 20 and the auxiliary shaft 22 are rotating in the same direction. Thus, wiper 208 moves clockwise as denoted by arrow 214 and ring 206 rotates counter-clockwise as denoted by arrow 216. This is immaterial since any time that wiper 208 is in contact with non-conducting segment 206S, no signal can pass to cause engagement of hub 26.

But, it now becomes evident that a signal could pass through discs 182 and 184 whenever wiper 208 is in contact with the conducting portion 206S of ring 206 even though the discs (and therefore primary shaft 20 and auxiliary shaft 22) are not in synchronism because angular alignment of the teeth occurs each 1/60 of a revolution of hub 28 with respect to sleeve 30. If engagement was attempted upon each occurrence of angular alignment when hub 26 and sleeve 30 are not in synchronism, then the coupling would be damaged. It is for this reason that contacts 137 of pressure switch 134 are not closed until there is only one RPM difference in speed between primary shaft 20 and auxiliary shaft 22. This difference is sensed by differential 60 and translated to hydraulic pressure by differential output 62 being connected to pump 120. Thus, with only one RPM difference, the discs 182 and 184 will rotate one revolution for each tooth and corresponding tooth space on hub 26 and on sleeve 30 because of the 60:1 increase in the speed of the discs relative to the speed of the hub and sleeve as previously explained. In this manner, a signal to engage the coupling waits at contacts 137 of pressure switch 134 until the difference in speed between the primary shaft 20 and auxiliary shaft 22 is within one RPM of synchronism when contacts 137 will then close. A current signal from these contacts travels to disc 182 through rubbing contact 210. If wiper 208 then happens to be in contact with nonconducting segment 206S, the signal again waits until wiper 208 moves to the conducting portion of ring 206 and then passes through to contact 212 to cause engagement of sleeve 30 and hub 26. It is the one RPM difference in speed of shafts 20 and 22 that causes wiper 208 to move into contact with the conducting portion of ring 206. From the foregoing, it can be seen that engagement of coupling 18 can occur only when primary shaft 20 and auxiliary shaft 22 are in synchronism within one RPM and then only if teeth 32 on hub 26 are in angular alignment with the tooth spaces between the teeth 36 of sleeve 30 beyond the 40° dead band.

Actual engagement of coupling 18 is controlled by a conventional electric-solenoid operated air valve 220, FIG. 3, which remains in its "engage" or "disengage" position following energization of the appropriate solenoid for such positions. When valve 220 is in the engage position, pneumatic pressure from a conventional air supply 222 is directed through line 224 to pneumatic cylinders 46 which shift sleeve 30 into engagement with hub 26 as previously explained. A signal from sensor 180 transmitted by line 320 to the engage solenoid of valve 220 shifts the valve to the engage position when shafts 20 and 22 have reached synchronous speed and are in angular alignment as previously set forth. To disengage coupling 18, another different signal is applied to the disengage solenoid of valve 220 which shifts the valve to the disengage position at which time pneumatic pressure is supplied to cylinders 46 to retract rods 48 in a manner well understood by those skilled in the art.

The complete system is operated in three basic modes, as follows:

primary engine 10 running, auxiliary engine 16 "off" and disengaged from primary engine 10;

primary engine 10 running, auxiliary engine 16 running at "standby" and disengaged from primary engine 10; and primary engine 10 running, auxiliary engine 16 running and "engaged" to primary engine 10.

These modes are selected by a mode selector switch 300 which is a conventional three-position selector switch with ganged contacts A, B, and C as shown in FIG. 3. Operation of the mode switch 300 is best understood in connection with operation of the complete system, as follows.

In mode 1 denoted "off," current from current supply L1 is transmitted through contact 1A to the disengage solenoid of valve 220 by line 226 to positively maintain disengagement of coupling 18. Current from a supply of negative polarity DC voltage is transmitted through contact 1C and along line 228 through the normally closed contacts of a limit switch 302 in line 228 and to line 146 which carries the negative DC voltage to the wiper motor M causing it to return to its "off" position in the event it should be in a position other than off when switch 300 is moved to "off." When motor M returns to its off position, it strikes conventional limit switch 302 which opens its normally closed contacts in line 228 thereby leaving the motor M in its full off position. No power is supplied to the PVT 144 so that no current flows from it to motor M. R.H. pump 120 produces a pressure in line 124 in response to movement of the output shaft 62 of differential 60 because of the difference in speed between primary engine 10 (running) and auxiliary engine 16 (not running). During this mode, the fluid under pressure in line 124 merely passes through pressure relief valve 136 to the hydraulic fluid reservoir 132.

In mode 2 the switch 300 is moved to the "standby" position 2 for starting auxiliary engine 10 but leaving the coupling 18 disengaged. In position 2, current is supplied from L1 through contact 2B to the PVT 144 and current from L1 is supplied through contact 2A to the disengage solenoid of valve 220 to maintain the valve in the disengage position. Fluid pressure will initially be present in line 142 from R.H. pump 120 to PVT 144 because of the difference in speed between primary engine 10 and auxiliary engine 16, that is, engine 16 will be starting from its "at rest" condition. This pressure produces a plus polarity voltage in line 146 from PVT 144. The output from PVT 144 in line 146 passes through the normally closed contacts of switch 148 in line 146 to wiper motor M. Wiper motor M will move from its "off" position toward the right as shown in FIG. 3 because of the difference in speed between primary engine 10 and auxiliary engine 16 as previously explained. When auxiliary engine 16 reaches synchronous speed with primary engine 10 there will no longer be fluid pressure in line 142 and no output will be present in line 146 from PVT 144 and wiper motor M will be at rest. When wiper 152 moves from its off position, current picked off from transformer 150 is carried by line 160 to the throttle control 162 which starts auxiliary engine 16 and increases its speed as wiper 152 moves to the right. Should auxiliary engine 16 tend to overspeed or underspeed with respect to the speed of primary engine 10, it will result in an output from PVT 144 which will move wiper motor M in a direction corresponding to the difference in speed until it again stops in response to a lack of output from PVT 144. Thus, the speed of auxiliary engine 16 tracks the speed of primary engine 10 so that it will always be very near to synchronous speed with engine 10 thereby permitting engagement of coupling 18 very rapidly when auxiliary engine 16 is running on "standby."

When it is desired to operate in mode 3 to engage the auxiliary engine 16 with primary engine 10, coupling 18 is engaged by moving the mode switch 300 to the "engage" position 3. This supplies current from L1 through contact 3B to PVT 144 which provides an output to wiper motor M as previously explained when there is a difference in speed between auxiliary engine 16 and primary engine 10. Current is also supplied from L1 through contact 3A to pressure switch 134. This current waits at contacts 137 until switch 134 closes in response to the difference in speed between primary shaft 20 and auxiliary shaft 22 reaching synchronism within one rpm. At this point, contacts 137 of pressure switch 134 close and the current travels along line 318 to the sensor 180 where it again waits at rubbing contactor 210 until the wiper 208 is in contact with the conducting portion of ring 206 signifying alignment of the teeth 36 on sleeve 30 with the spaces between the teeth 32 on hub 26. At this time the current passes through sensor 180 and along line 320 to the engage solenoid of valve 220 which shifts to the engage position thereby supplying pneumatic pressure to cylinders 46 which shift sleeve 30 into engagement with hub 26. When sleeve 30 shifts, that is, moves to the left as shown in FIG. 3, it strikes limit switch 148 thereby opening its normally closed contacts 148 in line 146 from PVT 144 to disconnect the output of PVT 144 to wiper motor M. Simultaneously another set of normally open contacts of switch 148 close in line 322 to permit a control signal from a conventional manual motor control 330 to flow in line 146 to wiper motor M so that the speed of both the auxiliary engine 16 and primary engine 10 can be controlled from manual motor control 330. For example, the manual motor control 330 may be operated to increase the speed of primary engine 10 through its own throttle control 332 and at the same time supply a positive voltage to wiper motor M to increase the speed of the auxiliary engine 16 by increasing the voltage picked off from variable transformer 150 which then operates throttle control 162 as previously explained. The speed of both engines may be similarly decreased.

When it is desired to again place the auxiliary engine 16 on "standby" or to shut it down completely, the mode switch 300 is moved to the desired position and the above described operational sequences for each position of switch 300 will occur.

If desired, conventional speed indicator gauges 340 may be connected to, for example, the intermediate shaft 90 and to the idler shaft 100 for indicating the speeds of the primary and auxiliary engines 10 and 16. The gauges may read from zero to whatever maximum speed the engines are to be run. Appropriate calibration can be used to indicate the speed of the engines even though shafts 90 and 100 may not be running at actual engine speed.

In addition, a similar speed indicator gauge 350 may be connected to differential output shaft 62. The gauge may read zero in the center of the dial and toward maximum speed on either side of zero. This enables the operator to determine which engine is running faster than the other and when they are running at synchronous speed.

In the event that an electric or other type clutch is used in place of coupling 18 and that has no interlocking surfaces that must be angularly aligned, the sensor 180 and valve 220 may be omitted. In this example, the current signal from pressure switch 134 would go directly to a control switch for energizing the clutch. Thus, the clutch could be engaged when the engines reached synchronous speed within one rpm, or less by adjusting pressure switch 134 to close at a lower pressure signifying less than a one rpm difference in speed. Line 226 from contacts 1A and 2A would go to the control switch for de-energizing the coupling.

The foregoing has described the construction and operation of the preferred embodiment of the invention. It should be understood that it is not limited to the use of the specific pumps, valves, transducers, and the like described herein, there being other similar devices capable of providing speed-to-voltage signals, speed tracking, etc. However, it should be recognized that the use of differential 60 to indicate synchronous speed provides a simple and reliable means for doing so. And, the sensor 180 provides an equally reliable means for sensing the alignment of interlocking surfaces to be engaged. Thus, these features combined make it possible to engage such surfaces only when they are at substantially synchronous speed and in substantial angular alignment which has been difficult, if not impossible, in the past.

Furthermore, the invention is deemed to include the necessary supports, housings, bearings, lubrication systems, and the like which have been omitted for clarity but which are well recognized by those skilled in the art.

Thus, the invention having been described in its best embodiment and mode of operation, that which is desired to be claimed by letters Patent is:

1. A method of controlling the engagement of an accelerating or decelerating auxiliary propulsion system with a running primary propulsion system upon the occurrence of synchronous speed of the systems comprising the steps of:
rotating said primary system at a substantially constant speed;
accelerating or decelerating the rotational speed of said auxiliary system toward the speed of said primary system;
sensing the impending occurence of synchronous rotational speed of said systems; and
automatically engaging driving elements of said systems at said synchronous speed in response to said sensing;
for coupling said systems for simultaneous operation.

2. The method of claim 1 and in addition:
controlling the acceleration or deceleration of said auxiliary system substantially proportional to the gradually decreasing difference in rotational speeds of said systems,
for causing the approach of synchronous speed to occur slowly.

3. The method of claim 1 and in addition:
sensing angular alignment of said driving elements when substantially synchronous speed of said systems has been attained and thereafter
automatically engaging said driving elements in response to the sensing of substantially synchronous speed and alignment thereof.

4. A method of sensing the approach of synchronous speed of two rotating systems to be coupled for simultaneous operation comprising the steps of:
producing a first output speed directly proportional to the speed of one of said systems;
producing a second output speed directly proportional to the speed of the other of said systems;
producing a third output speed directly proportional to the difference in speeds of said first and second output speeds, said third output speed reaching zero amplitude upon the occurrence of synchronous speed of said first and second output speeds; and
sensing the approach of zero amplitude of said third output speed,
for indicating the impending occurrence of synchronous speed of said systems.

5. The method of claim 4 and in addition:
coupling said systems for simultaneously operation in response to said third output speed attaining a preselected amplitude approaching zero amplitude.

6. The method of claim 5 and in addition:
sensing the angular alignment of said rotating systems when said third output speed attains said predetermined amplitude and thereafter
coupling said systems for simultaneous operation following alignment of said systems.

7. The method of claim 4 wherein sensing the approach of zero amplitude comprises the steps of:
producing a signal proportional to the amplitude of said third output speed; and
sensing the magnitude of said signal.

8. The method of claim 4 wherein sensing the approach of zero amplitude comprises the steps of:
producing a first fluid pressure in response to the approach of zero amplitude from a first direction;
producing a second fluid pressure in response to the approach of zero amplitude from a second direction; and
sensing the approach of zero amplitude from either said first or said second direction.

9. The method of claim 8 and in addition:
energizing a pressure switch in response to said first or said second fluid pressure reaching a preselected magnitude for initiating the coupling of said systems.

10. The method of claim 9 and in addition:
rotating a first disc conductor proportional to the speed of one of said systems in fixed angular relationship with a portion of said one system;
rotating a second conductor disc in contact with said first disc and proportional to the speed of the other of said systems in fixed angular relationship with a portion of said other system; and
conducting a signal from said pressure switch through said first and second discs when said portions of said systems are in angular alignment.

11. The method of claim 8 in addition:
producing a speed control signal proportional to the magnitude of said first or said second fluid pressures; and
controlling the speed of one of said systems in response to said signal.

12. A method of supplying additional power to a load comprising the steps of:
driving said load with a primary power source;
driving said load with an auxiliary power source coupled in series to said primary power source;
producing a signal corresponding to the speed of said primary power source; and
automatically maintaining the output speed of said auxiliary power source substantially equal to the output speed of said primary power source in response to said signal.

13. Apparatus for controlling the engagement of an accelerating or decelerating auxiliary propulsion system with a running primary propulsion system upon the occurrence of synchronous speed of the systems, comprising:
first clutch means connected for rotation with said primary system;
second clutch means connected for rotation with said auxiliary system and arranged to coaxially engage said first clutch means;

first output means responsive to the speed of said primary system;

second output means responsive to the speed of said auxiliary system;

third output means responsive to the difference in speed of said first and second output means, said third output means reaching zero amplitude upon the occurrence of synchronous speed of said systems; and engagement means responsive to said third output means for engaging said first and second clutch means for driving rotation upon the occurrence of substantially synchronous speed of said systems, for coupling said systems for simultaneous operation.

14. The apparatus of claim 13 further including:

speed detector means for sensing the approach of zero amplitude of said third output means, said engagement means responsive to said detector means indicating a preselected amplitude of said third output means above or below zero amplitude for initiating engagement of said first and second clutch means.

15. The apparatus of claim 14 wherein:

said detector means produces a signal proportional to the amplitude of said third output means for controlling the rate of acceleration or deceleration of said auxiliary system.

16. The apparatus of claim 13 further including:

sensor means for sensing the angular alignment of said first and second clutch means; and control means responsive to said sensor means for initiating engagement of said clutch means upon alignment thereof.

17. The apparatus of claim 13 further including:

signal means responsive to said third output means for producing a control signal proportional to the speed of said third output means, said engagement means being responsive to said signal means indicating a preselected speed of said third output means approaching zero speed for initiating engagement of said first and second clutch means.

18. The apparatus of claim 17 wherein said signal means comprises:

pressure means for producing a first fluid pressure in response to said third output means approaching zero speed from a first direction and for producing a second fluid pressure in response to said third output means approaching zero speed from a second direction; and pressure switch means responsive to said pressure means for initiating engagement of said clutch means upon said first or second fluid pressure attaining a preselected magnitude.

19. The apparatus of claim 18 further including:

transducer means responsive to said pressure means to reduce the rate of acceleration or deceleration of said auxiliary propulsion system as synchronous speed of said systems is approached.

20. The apparatus of claim 13 wherein said first and second clutch means comprise cooperating halves of an electric clutch means engageable in response to a signal from said engagement means.

21. The apparatus of claim 13 wherein:

said first and second clutch means comprise cooperating halves of a jaw clutch means; and said engagement means includes a shifter means for axially shifting one of said halves into driving engagement with the other of said halves in response to said third output means reaching a preselected amplitude.

22. The apparatus of claim 13 wherein:

said first and second clutch means comprise cooperating male and female portions of a gear-type coupling; and said engagement means includes a shifter means for axially shifting the gear teeth of said portions into driving engagement upon energization of said shifter means.

23. The apparatus of claim 13 wherein:

said third output means includes a first input means responsive to the speed of said first output means and a second input means responsive to the speed of said second output means, said third output means producing a speed directly proportional to the difference in speeds of said first and second input means, said third output means thereby coming to rest upon synchronization of said first and second input means.

24. The apparatus of claim 23 wherein said third output means comprises a planetary differential and said first input means rotates in a first direction at a speed proportional to the speed of said primary system and said second input means rotates in a second direction opposite to said first direction and at a speed proportional to the speed of said auxiliary system for rotating said third output means in the same direction as the faster of said first and second input means and at a speed proportional to the difference in speed between said first and second input means.

25. The apparatus of claim 16 wherein said sensor means comprises:

first and second coaxially aligned conducting discs;

said first disc rotatable at a speed corresponding to the speed of said first clutch means and in fixed angular relationship thereto;

said second disc rotatable at a speed corresponding to the speed of said second clutch means and in fixed angular relationship thereto;

said first disc including a nonconducting surface in fixed angular relationship to a first portion of said first clutch means and a conducting surface in fixed angular relationship with a second portion of said first clutch means;

said second disc including a conducting surface in fixed angular relationship to a portion of said second clutch means and engageable with both of said nonconducting and conducting surfaces of said first disc during rotation thereof, said discs conducting a current signal applied to one of said discs when the conducting surface of said second disc is engaged with the conducting surface of said first disc, for conducting said signal to said engagement means upon the occurrence of angular alignment of said second portion of said first clutch means with said portion of said second clutch means.

26. A coupling for connecting a pair of rotating power sources for simultaneous operation comprising:

a first coupling half connected for rotation with one of said power sources;

a second coupling half connected for rotation with the other of said power sources in coaxial alignment with said first half;

detector means external to said coupling responsive to substantially synchronous speed of said power sources for producing an engage signal to initiate engagement of said coupling halves; and sensor means external to said coupling responsive to angular alignment of mating portions of said coupling halves for directing said engage signal to an engaging means for engaging said coupling halves in driving rotation.

* * * * *